United States Patent [19]

Sasaki et al.

[11] Patent Number: 5,265,027
[45] Date of Patent: Nov. 23, 1993

[54] SYSTEM FOR CONTROLLING THREE-DIMENSIONAL COORDINATE TRANSFORMATION

[75] Inventors: Takao Sasaki, Hachioji; Kentaro Fujibayashi, Musashino; Masahiko Miyake, Minamitsuru, all of Japan

[73] Assignee: Fanuc Ltd, Minamitsuru, Japan

[21] Appl. No.: 761,800

[22] PCT Filed: Jan. 11, 1991

[86] PCT No.: PCT/JP91/00020
§ 371 Date: Sep. 16, 1991
§ 102(e) Date: Sep. 16, 1991

[87] PCT Pub. No.: WO91/10944
PCT Pub. Date: Jul. 25, 1991

[30] Foreign Application Priority Data

Jan. 18, 1990 [JP] Japan ............................. 2-9427

[51] Int. Cl.⁵ ............................................. G05B 19/18
[52] U.S. Cl. ............................ 364/474.36; 364/474.11
[58] Field of Search ................... 364/474.36, 474.11, 364/474.02; 395/86; 318/568.19, 625; 82/118, 119, 120, 129, 159

[56] References Cited

U.S. PATENT DOCUMENTS

| | | | |
|---|---|---|---|
| 4,413,539 | 11/1983 | Ishizuka et al. | 82/159 X |
| 4,979,121 | 12/1990 | Inoue et al. | 364/474.11 X |
| 4,981,402 | 1/1991 | Krenzer et al. | 364/474.02 X |
| 5,058,029 | 10/1991 | Uemura | 364/474.11 X |

FOREIGN PATENT DOCUMENTS 3722084 1/1988 Fed. Rep. of Germany .
0103714 3/1984 PCT Int'l Appl. .

Primary Examiner—Joseph Ruggiero
Attorney, Agent, or Firm—Staas & Halsey

[57] ABSTRACT

A three-dimensional coordinate transformation control system controls three-dimensional coordinate transformation in a computerized numerical control apparatus for controlling a machine tool having a plurality of heads. A pre-processing calculating unit (2) decodes a machining program (1), effects three-dimensional coordinate transformation for only a first head in a three-dimensional coordinate transforming unit (3), and distributes pulses based on transformed coordinates to a pulse distributing unit (4). For a second head, the coordinates for the first head are used as they are, and pulses based on the coordinates are distributed by a pulse distributing unit (5). The three-dimensional coordinate transformation is therefore calculated by a reduced number of times, and the burden on the computerized numerical control apparatus for calculations is reduced.

1 Claim, 2 Drawing Sheets

SYSTEM FOR CONTROLLING THREE-DIMENSIONAL COORDINATE TRANSFORMATION

BACKGROUND OF THE INVENTION

The present invention relates to a system for controlling three-dimensional coordinate transformation in a computerized numerical control apparatus for controlling a machine tool having a plurality of heads, and more particularly to a three-dimensional coordinate transformation control system which is capable of simply calculating three-dimensional coordinate transformation.

DESCRIPTION OF THE RELATED ART

Machine tools with a plurality of heads are used to machine a plurality of identical workpieces simultaneously. These heads are parallel-controlled by a computerized numerical control apparatus. While the machine tools with plural heads are generally controlled according to a single machining program, the heads are controlled by respective internal calculations, e.g., pre-processing calculations.

When three-dimensional coordinate transformation is to be executed with respect to conventional parallel axes, it has been customary to determine transformation formulas for the respective heads and effect calculations according to the determined transformation formulas even though the same motion command is given. Stated otherwise, as many coordinate transformation calculations as the number of heads used have been carried out.

Since the three-dimensional coordinate transformation is calculated using a transformation matrix, however, the amount of calculations needed is considerable, placing a large burden on the processing time of the computerized numerical control apparatus.

With the parallel-axis control, if the same motion command is given, then coordinates that have been transformed into the three-dimensional coordinate system are common for the heads. Therefore, the three-dimensional coordinate transformation may be calculated with respect to only one of the heads, and the calculated coordinates for the head may be employed with respect to the other heads without calculating the three-dimensional coordinate transformation for those other heads.

SUMMARY OF THE INVENTION

In view of the above drawbacks of the conventional three-dimensional coordinate transformation control system, it is an object of the present invention to provide a three-dimensional coordinate transformation control system which is capable of simply calculating three-dimensional coordinate transformation.

In order to achieve the above object, there is provided in accordance with the present invention a system for controlling three-dimensional coordinate transformation in a computerized numerical control apparatus for controlling a machine tool having a plurality of heads, comprising pre-processing calculating means for decoding a machining program, effecting three-dimensional coordinate transformation for a first head, and outputting pulse distribution data, and a plurality of pulse distributing means associated respectively with the heads of the machine tool, for distributing pulses In response to the pulse distribution data from the preprocessing calculating means.

The preprocessing calculating means executes three-dimensional coordinate transformation for only a first head. For the other head or heads, the transformed coordinates are used as they are, and pulses are distributed on the basis of the transformed coordinates. In this manner, the three-dimensional coordinate transformation is calculated by a reduced number of times, and the burden on the computerized numerical control apparatus for calculations is reduced.

DESCRIPTION OF THE PREFERRED EMBODIMENT

An embodiment of the present invention will hereinafter be described with reference to the drawings.

Figure 1:
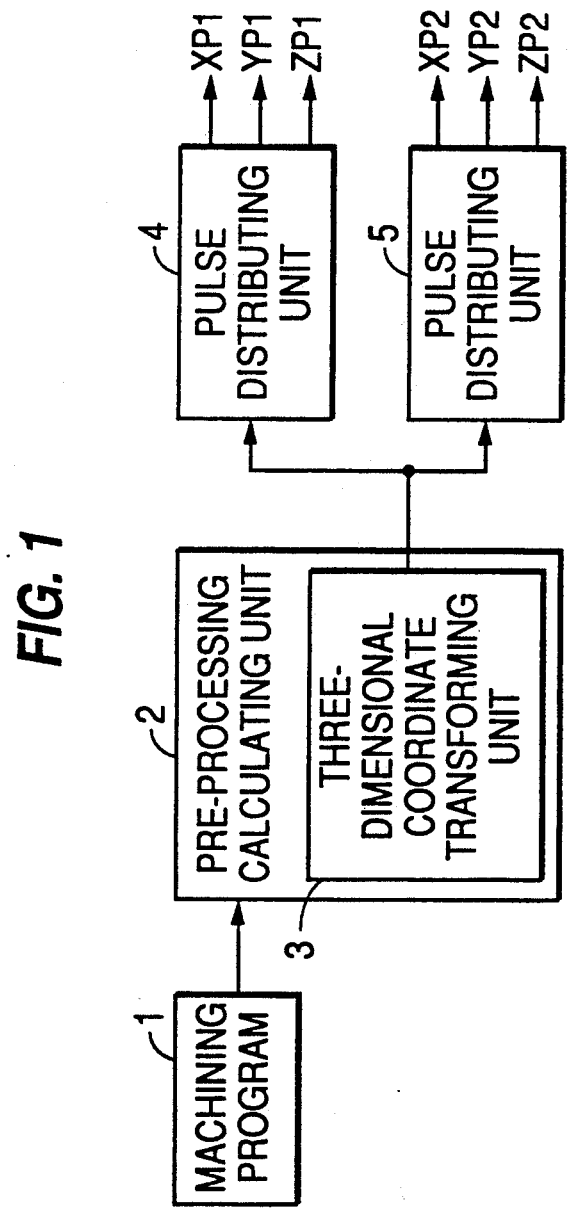
FIG. 1 is a block diagram of a three-dimensional coordinate transformation control system according to an embodiment of the present invention.

FIG. 1 shows in block form a three-dimensional transformation control system according to an embodiment of the present invention. In the illustrated embodiment, the three-dimensional transformation control system will be described for the control of a machine tool having two heads. A pre-processing calculating unit 2 provides means for reading a machining program 1, decodes the machining program 1, and calculates pulse distribution data. For example, the pre-processing calculating means 2 determines which plane a given command belongs to, whether interpolation is linear or circular, etc., and produces necessary pulse distribution data.

The pre-processing calculating means 2 includes a three-dimensional coordinate transforming unit 3. The three-dimensional coordinate transforming unit 3 is required, for example, when a head is controlled to be perpendicular to a slanted surface for drilling the slanted surface. In this case, the three-dimensional coordinate transforming unit 3 provides means for performing three-dimensional coordinate transformation from an ordinary coordinate system into a coordinate system perpendicular to the slanted surface.

The three-dimensional coordinate transforming means 3 effects three-dimensional coordinate transformation on the pulse distribution data for the first head, and transmits the pulse distribution data to a pulse distributing unit 4 and a pulse distributing unit 5. The three-dimensional coordinate transformation is therefore carried out once. The pulse distributing unit 4 provides means for controlling the first head, whereas the pulse distributing unit 5 provides means for controlling the second head.

The pulse distributing means 4 outputs distributed pulses XP1, YP1, ZP1 for controlling the first head to respective servomotors. The pulse distributing means 5 outputs distributed pulses XP2, YP2, ZP2 for controlling the second head to respective servomotors.

Figure 2:
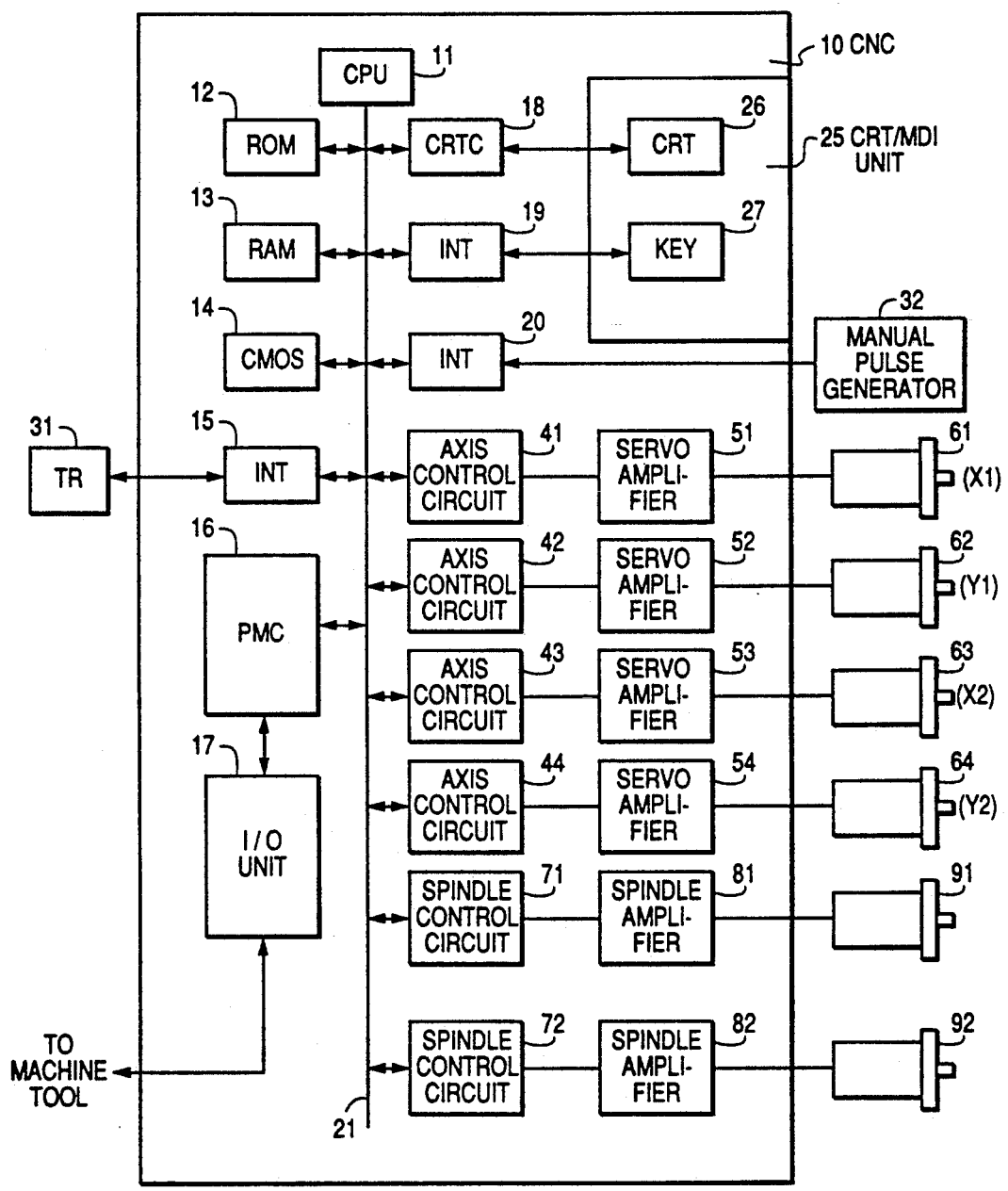
FIG. 2 is a block diagram of a hardware arrangement of a computerized numerical control (CNC) apparatus for implementing the principles of the present invention.

FIG. 2 shows in block form a hardware arrangement of a computerized numerical control (CNC) apparatus for implementing the principles of the present invention. The computerized numerical control (CNC) apparatus, generally denoted by the reference numeral 10, has a processor 11 for controlling overall operation of the computerized numerical control (CNC) apparatus.

More specifically, the processor 11 reads a system program stored in a ROM 12, and controls overall operation of the computerized numerical control (CNC) apparatus according to the read system program. A RAM 13 temporarily stores calculated data, display data, and other data, the RAM 13 comprising an SRAM. A CMOS 14 stores tool correctives, pitch error correctives, a machining program, and parameters. Although not shown, the CMOS 14 is backed up by a battery so that it serves as a nonvolatile memory even when the power supply of the computerized numerical control (CNC) apparatus 10 is turned off. Therefore, the data stored in the CMOS 14 are stored even when the computerized numerical control (CNC) apparatus 10 is de-energized.

An interface 15 serves to connect an external device 31 to the computerized numerical control (CNC) apparatus 10, the external device 31 comprising a paper tape reader, a paper tape puncher, a paper tape reader/puncher, or the like. A NC program is read from the paper tape reader, and the machining program edited in the computerized numerical control (CNC) apparatus 10 may be output to the paper tape puncher.

A PMC (programmable machine controller) 16 controls the machine tool according to a sequence program of ladder configuration which is stored in the CNC 10. Specifically, the PMC 16 converts M, S, and T functions specified according to the machine program into signals required by the machine tool according to the sequence program, and outputs the signals through an I/O unit 17 to the machine tool. The output signals energize electromagnets in the machine tool, thereby activating hydraulic valves, pneumatic valves, and electric actuators. The PMC 16 also receives signals from limit switches in the machine tool and switches on a machine control console, processes the received signals as required, and transfers the processed signals to the processor 11.

A graphic control circuit 18 converts digital datas, i.e., present positions of the axes, alarms, parameters, and image data into image signals, and outputs the image signals. The image signals are sent to a display device 26 in a CRT/MDI unit 25, and displayed on the display device 26. An interface 19 receives data from a keyboard 27 in the CRT/MDI unit 25, and transfers the received data to the processor 11.

An interface 20 is connected to a manual pulse generator 32 and receives pulses from the manual pulse generator 32. The manual pulse generator 32 is mounted on the machine control console, and is manually operated to position movable components of the machine tool with precision.

Axis control circuits 41 through 44 receive motion commands for the axes from the processor 11, and outputs the received motion commands to servoamplifiers 51 through 54, respectively. In response to the motion commands, the servoamplifiers 51 through 54 energize respective servomotors 61 through 64 for the respective axes. The servomotors 61 through 64 have built-in pulse coders as angular position detectors for producing position signals that are fed back as pulse trains. Linear scales may be employed as the position detectors. The pulse trains may be converted from frequency to velocity (F/V) so that velocity signals can be generated from the pulse trains. The feedback lines for the position signals and the feedback of the velocity signals are omitted from illustration. The servomotors 61, 62 serve to control the first head, whereas the servomotors 63, 64 serve to control the second head. Axis control circuits, servoamplifiers, and servomotors for Z1 and Z2 axes are omitted from illustration.

Spindle control circuits 71, 72 output spindle speed signals to respective spindle amplifiers 81, 82 in response to spindle rotation commands and commands for the orientation of spindles. Responsive to the spindle speed signal, the spindle amplifiers 81, 82 energize the respective spindle motors 91, 92 to rotate at commanded rotational speeds.

With the present invention, as described above, three-dimensional coordinate transformation is carried out in order to control the first head, thereby determining pulse distribution data. The determined pulse distribution data are output to the pulse distribution means for controlling the other head. Therefore, the three-dimensional coordinate transformation is carried out only once, thereby lessening the burden on the computerized numerical control apparatus for calculations and shortening the time required for the calculations.

What is claimed is:

1. A system for controlling three-dimensional coordinate transformation in a computerized numerical control apparatus for controlling a machine tool having a plurality of heads, comprising:
   pre-processing calculating means for decoding a machining program, effecting three-dimensional coordinate transformation for a first head, and outputting pulse distribution data; and
   a plurality of pulse distributing means associated respectively with the heads of the machine tool, for simultaneously distributing pulses to the plurality of heads in response to the pulse distribution data from said pre-processing calculating means for the first head.

* * * * *